United States Patent [19]

Butt

[11] 4,273,599
[45] Jun. 16, 1981

[54] PROCESS FOR REINFORCING POLYVINYL CHLORIDE PIPE BY WRAPPING WITH GLASS FIBERS COATED WITH A POLYESTER RESIN COMPOSITION

[75] Inventor: Frederick A. Butt, Croton, Ohio

[73] Assignee: Owens-Corning Fiberglas Corporation, Toledo, Ohio

[21] Appl. No.: 54,329

[22] Filed: Jul. 2, 1979

Related U.S. Application Data

[62] Division of Ser. No. 866,140, Dec. 30, 1977, Pat. No. 4,189,452.

[51] Int. Cl.$^3$ .............................................. B65C 54/64
[52] U.S. Cl. ..................................... 156/172; 138/141; 138/153; 138/172; 138/DIG. 2; 138/DIG. 7; 156/332; 242/7.02; 242/7.22; 428/36
[58] Field of Search ............... 156/172, 332, 187; 242/7.02, 7.22; 138/141, 172, 153, DIG. 2, DIG. 7; 428/36; 525/444

[56] References Cited

U.S. PATENT DOCUMENTS

| | | | |
|---|---|---|---|
| 2,814,313 | 11/1957 | Tate | 156/332 |
| 2,851,379 | 9/1958 | Staudinger et al. | 156/332 |
| 2,873,226 | 2/1959 | Davies et al. | 156/332 |
| 2,985,615 | 5/1961 | Tunteler | 156/332 |
| 3,002,534 | 10/1961 | Noland | 156/172 |
| 3,607,510 | 9/1971 | Serafino et al. | 156/172 |
| 4,013,614 | 3/1977 | Self | 156/332 |

*Primary Examiner*—John J. Gallagher
*Attorney, Agent, or Firm*—Ronald C. Hudgens; Philip R. Cloutier; James B. Wilkens

[57] ABSTRACT

A polyester resin composition is disclosed. The composition consists essentially of a blend of a diethylene glycol:neopentyl glycol:maleic:isophthalic acid polyester and a propylene glycol:isophthalic acid:maleic polyester, together with a copolymerizable monomer in an amount sufficient for reaction with the polyester blend to produce a thermoset article. In a preferred disclosed composition, the blend is composed from about 5 to 15 percent by weight of the diethylene glycol polyester and from about 95 to 85 percent of the propylene glycol polyester, together with from 35 to 45 percent by weight of styrene as a copolymerizable monomer, based upon the weight of the polyester blend and styrene.

5 Claims, No Drawings

PROCESS FOR REINFORCING POLYVINYL CHLORIDE PIPE BY WRAPPING WITH GLASS FIBERS COATED WITH A POLYESTER RESIN COMPOSITION

This application is a division of our copending application Ser. No. 866,140 filed Dec. 30, 1977 for POLYESTER RESIN COMPOSITION, now U.S. Pat. No. 4,189,452.

Polyester resins and blends thereof with copolymerizable monomers have been known for many years and have been found to be useful in producing various articles, and by numerous processing techniques. One such technique, known as filament winding, involves the winding of glass fiber filaments onto a suitable mandrel, and the application of a curable polyester composition as a binder for the wound filaments. The filament winding technique has been employed to produce a reinforcing coating on the exterior of polyvinyl chloride pipe. However, so far as is known, it has heretofore been necessary, in producing polyvinyl chloride pipe reinforced by the filament winding technique, first to apply a polyester gel coat to the exterior of the pipe, and to allow that gel coat to cure to such an extent that it provides adhesion, before the filament winding could be applied to the exterior of the pipe together with a curable, polyester binder composition.

The present invention is based upon the discovery that a curable polyester composition consisting essentially of a blend of two different polyesters can be used in the filament winding technique to produce exteriorly reinforced polyvinyl chloride pipe by the filament winding technique, and without the necessity for a preliminary application of a gel coat of a polymerizable polyester composition.

The instant invention, accordingly, provides a polyester resin composition which consists essentially of a blend of two different polyesters with a copolymerizable monomer in an amount sufficient for reaction with the polyester blend to produce a thermoset article. One of the polyesters of the blend is a diethylene glycol: neopentyl glycol:maleic:isophthalic acid polyester, while the other is a propylene glycol:isophthalic acid:-maleic polyester. The preferred copolymerizable monomer is styrene, for reasons of cost, although diallyl phthalate and any of the other numerous copolymerizable monomers can be used, if the added expense is warranted by the enhancement of properties which is achieved. Preferably, the diethylene glycol polyester constitutes from about 5 to about 15 percent* of the blend, while the propylene glycol polyester constitutes from about 95 percent to about 85 percent thereof, excluding the copolymerizable monomer, and other usual ingredients, particularly an initiator for copolymerization between the polyester blend and the copolymerizable monomer. Most desirably, the molecular proportions of the diethylene glycol polyester are substantially 1:5:2:4 for the diethylene glycol, the neopentyl glycol, the maleic and the isophthalic acid, respectively, while the molecular proportions of the propylene glycol polyester are substantially 2½:1:1 for the propylene glycol, the isophthalic acid and the maleic, respectively.

*The terms "percent" and "parts" are used herein, and in the appended claims, to refer to percent and parts by weight, unless otherwise indicated.

The following Example is presented solely for the purpose of further illustrating and disclosing, and not of limiting, the invention.

EXAMPLE

A blend was prepared from 90 parts of a diethylene glycol polyester-styrene composition containing 60 percent of the diethylene glycol polyester with 10 parts of a propylene glycol polyester-styrene composition containing 56 percent of the polyester. Both of the polymerizable polyester compositions are commercially available. The diethylene glycol polyester was produced by esterifying diethylene glycol, neopentyl glycol, maleic anhydride and isophthalic acid in molecular proportions of substantially 1:5.1:1.7:4 to an acid number of 24. The propylene glycol polyester was produced by esterifying propylene glycol, isophthalic acid and maleic anhydride in molecular proportions of substantially 2.5:1:1 to an acid number of 17. About 1 percent additions of methylethylketone peroxide and of 0.2 percent of cobalt octoate were made to the polyester blend, and the resulting composition was used by the filament winding technique to produce exteriorly reinforced polyvinyl chloride pipe. The filaments were drawn through a resin tank containing the polymerizable polyester resin blend, and the resulting resin-coated filaments were wound generally in a cork-screw pattern around the exterior of the pipe. This procedure produced an exterior reinforcement consisting of substantially 70 percent of the polyester resin blend and 30 percent of the wound filaments. When an uncured reinforced exterior layer approximately ⅛ inch in thickness had been built up on the pipe, the polyester composition was allowed to cure at room temperature of about 75° F. Testing indicated satisfactory adhesion between the cured polyester and the polyvinyl chloride of the pipe, as well as satisfactory crushing strength and resistance to thermal cycling testing.

It will be apparent that various changes and modifications can be made from the specific details set forth herein without departing from the spirit and scope of the invention as defined in the following claims.

What we claim is:

1. A process for reinforcing polyvinylchloride pipe, comprising:
   (a) coating glass fibers with a liquid resin composition consisting essentially of:
      (i) a first polyester of diethylene glycol, neopentyl glycol, maleic acid or anhydride and isophthalic acid,
      (ii) a second polyester of propylene glycol, maleic acid or anhydride and isophthalic acid,
      (iii) a monomer copolymerizable with said polyesters, and
      (iv) an initiator for inducing copolymerization of said monomer with said polyesters;
   (b) winding the resin-coated glass fibers around the exterior of said pipe to make direct contact of said resin composition with said pipe; and
   (c) then permitting the resin composition to cure, thereby forming a bond between said pipe and the reinforcing glass fibers wound thereabout.

2. The process of claim 1 wherein said glass fibers and said resin composition are used in a weight ratio of about 3 to 7, respectively.

3. The process of claim 2 wherein the exterior reinforcing layer of glass fiber and resin composition is about one-eighth inch in thickness.

4. The process of claim 1 wherein the relative proportions, by weight, of said first polyester and said second polyester in said liquid resin composition are about 5:95 to about 15:85.

5. The process of claim 4 wherein said first polyester is formed of diethylene glycol, neopentyl glycol, maleic acid or anhydride and isophthalic acid in the mole ratios of about 1:5:2:4, respectively, and said second polyester is formed of propylene glycol, maleic acid or anhydride and isophthalic acid in the mole ratios of about 2:5:1:1, respectively.

* * * * *